May 12, 1931.　　　C. H. SAMPSON　　　1,805,375
MECHANICAL MOVEMENT
Filed Feb. 18, 1929　　　2 Sheets-Sheet 1

INVENTOR
Charles H. Sampson
BY
his ATTORNEY

May 12, 1931.　　　C. H. SAMPSON　　　1,805,375
MECHANICAL MOVEMENT
Filed Feb. 18, 1929　　　2 Sheets-Sheet 2
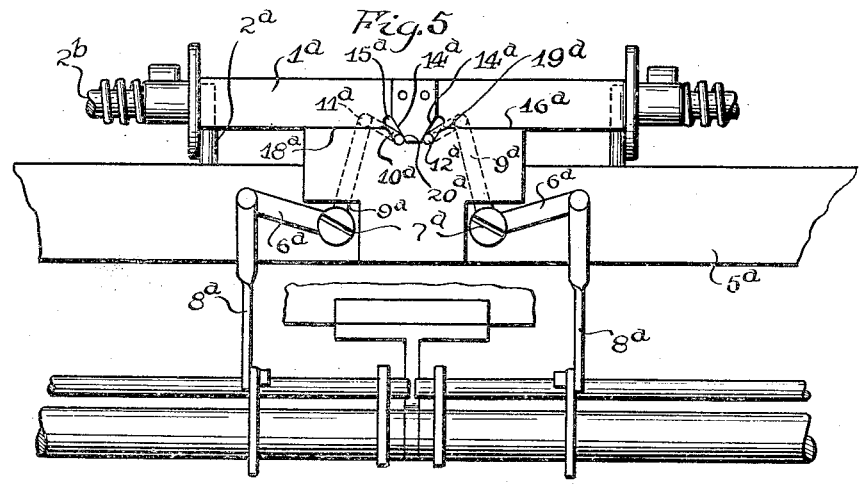
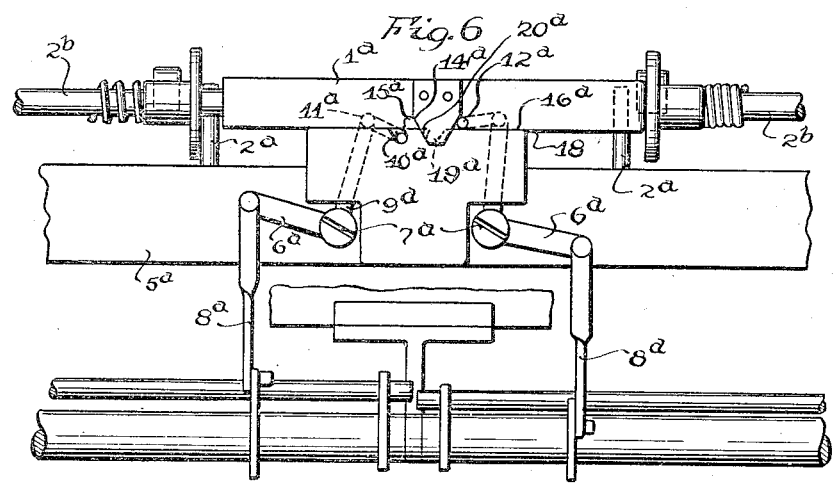
INVENTOR
Charles H. Sampson
BY
his ATTORNEY Patented May 12, 1931

1,805,375

UNITED STATES PATENT OFFICE

CHARLES H. SAMPSON, OF ROCHESTER, NEW YORK, ASSIGNOR TO SAMPSON PERMA-GRAPH COMPANY INC., OF ROCHESTER, NEW YORK, A CORPORATION OF NEW YORK

MECHANICAL MOVEMENT

Application filed February 18, 1929. Serial No. 340,845.

The present invention relates to a mechanical movement and an object thereof is to provide a member shiftable in opposite directions through two shifting mechanisms with novel means for holding one of the mechanisms against operation when the shiftable member is under control of the other mechanism. Another object of the invention is to employ two mechanisms for moving a shiftable member in opposite directions and to utilize said mechanisms in a novel manner for locking said member aginst movement when neither of the shifting mechanisms are operating the member.

To these and other ends, the invention consists of certain parts and combinations of parts, all of which will be hereinafter described: the novel features being pointed out in the appended claims.

In the drawings:

Fig. 5 is a view in elevation of another embodiment with the shiftable member in normal position; and Fig. 6 is a similar view of the same embodiment showing the shiftable member shifted by one of the shifting mechanisms.

It is desirable in machines to provide a shiftable member which may be moved in opposite directions by two independently acting shifting mechanisms in order to reduce the amount of movement of the shifting member when moved to either end of its line of movement. This invention provides not only for accomplishing this result, but has a novel means which locks one shifting mechanism against operation while the shiftable member is under the control of the other shifting mechanism. A novel means is also employed for locking the shiftable member against movement when in neutral or normal position.

Figure 1:
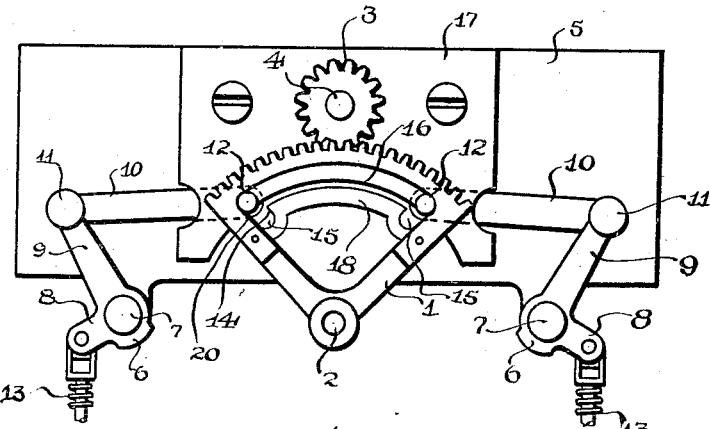
Fig. 1 is a plan view showing the member to be shifted in normal position.
Figure 2:
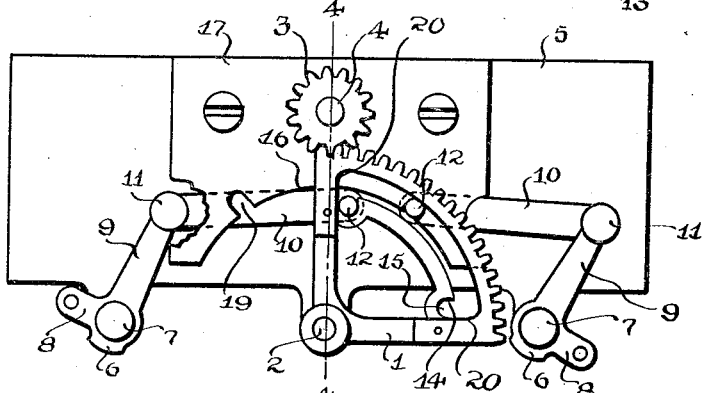
Fig. 2 is a like view showing the member shifted by one of the shifting members.
Figure 3:
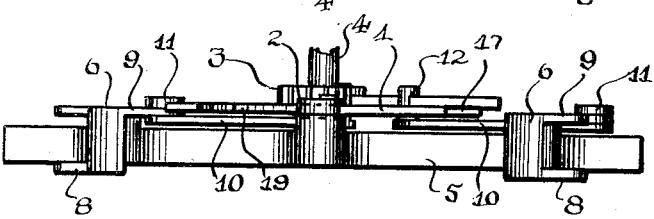
Fig. 3 is an edge view.
Figure 4:
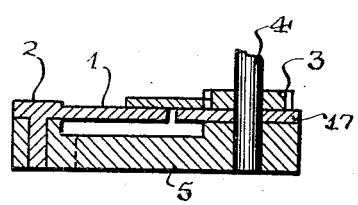
Fig. 4 is a section on the line 4—4, Fig. 2.

In the embodiment of the invention shown in Figs. 1 to 4, 1 indicates the shiftable member which, in this instance, is in the form of a swinging gear segment mounted to turn about the axis 2 and gearing with a pinion 3 on a shaft 4 which is supported by a plate 5 also supporting the segment 1.

The two shifting mechanisms, in this instance, each comprise a bell crank lever 6 pivoted at 7 to the supporting plate or member 5 and having one arm 8 connected to any suitable means which will exert a push thereon. The other arm 9 has a link 10 pivoted thereto at 11 and provided at its free end with an operating portion in the form of a lateral projection 12. A spring 13 is preferably connected to each shifting mechanism in order to hold the operating portion in its normal or neutral position.

In order that the two shifting mechanisms may connect with the shiftable member 1, the latter has two oppositely facing abutments 14 formed by a side of each of two pockets or recesses 15, in the shiftable member and the springs 13 tend to hold the operating portions out of the pockets and out of engagement with the abutments. Whereas, movement of either shifting mechanism carries its operating portion 12 into a pocket 15 to engage the abutment 14 thereof and cause the shifting of the shiftable member 1. In order to hold an operating portion 12 in a pocket 15 during such shifting, a fixed guide 16 may be employed, formed, in this instance, on a plate 17 rigidly secured to the plate 5 in spaced relation to the latter beneath the gear segment 1 but above the links 10.

It is also desirable to prevent one shifting mechanism being operated while the other has shifted the shiftable member away from normal position and to this end, a guide 18 is provided on the shiftable member 1, in this instance, extending between the pockets 14, and this guide will be engaged by the non-shifted mechanism to hold the latter against movement whenever the shiftable member is shifted away from normal or neutral position. When the two shifting mechanisms are in neutral positions, the portions 12 lie in pockets 19 formed, in this instance, at opposite ends of the guide 16, and the guide 18 maintains one of these portions 12 in its pocket during the shifting of the shiftable member 1.

In order to hold the shiftable member against free movement in its neutral or normal position, the shiftable member has two oppositely facing abutments 20 which are engaged by the portions 12 when the latter are both in normal positions in the pockets 19.

In the embodiment shown in Figs. 6 and 5, the shiftable member $1^a$ is in the form of a slide guided on a shaft $2^b$ and projections $2^a$ extended from a support $5^a$. On this support are pivoted at $7^a$ two bell crank levers $6^a$ having arms $8^a$ connected to mechanisms which will exert a pull on said arms. To the arms $9^a$ of said levers are pivoted at $11^a$ links $10^a$ which carry operating portions $12^a$. The shiftable member has two opposed abutments $14^a$ formed by a wall of each of two pockets $15^a$ and a guide $18^a$ on the shiftable member cooperates with one of these projections $12^a$ when the other is shifting the slide $1^a$ to hold such projection against movement in one of the pockets $19^a$, whereas a fixed guide $16^a$ cooperates with the shifted projection $12^a$ to hold the latter in connection with the shiftable member $1^a$. The shiftable member also carries two opposed abutments $20^a$ which cooperate with the projections $12^a$ to hold the shiftable member in neutral or normal position.

In both embodiments of the invention there is provided a shiftable member moved in opposite directions by two independently acting shifting mechanisms. The shiftable member is held in neutral or normal position by the shifting mechanism. A guide on the shiftable member holds the unshifted shifting mechanism against movement when the shiftable member is away from normal position, and a guide on a fixed part holds the shifting member operating the shiftable member in connection with the latter during the shifting.

What I claim as my invention and desire to secure by Letters Patent is:

1. The combination with a shiftable member, and two shifting mechanisms normally out of driving connection with said member, a guide on the shiftable member for holding one shifting mechanism out of driving connection with the shiftable member while the latter is shifted away from normal position, and a fixed guide cooperating with a shifting mechanism when the latter is shifting the shiftable member to hold said shifting mechanism in connection with the shiftable member.

2. The combination with a shiftable member having a guide and two pockets, of two oppositely acting shifting mechanisms each having a pivoted member provided with an operating portion normally lying out of such pockets but movable into one of the pockets to shift the shiftable member to carry the guide past the operating portion of the other shifting mechanism to prevent movement of the latter.

3. The combination with a shiftable member having two abutments, of a fixed guide, and two shifting mechanisms each having an operating portion normally lying out of cooperation with said abutments but movable into engagement with one of the said abutments to shift the shiftable member in one direction past the fixed guide to hold said operating portion in cooperation with its abutment.

4. The combination with a member to be shifted, of a fixed part, two opposed guides one arranged on the fixed part and the other on the shiftable member, each of said guides having two pockets registering with the pockets of the other guide when the shiftable member is in neutral position, and two shifting mechanisms for the shiftable member each having an operating portion normally lying in a pocket of the fixed guide and movable into the registering pocket of the guide of the shiftable member to cooperate with the fixed guide during the travel of the member and cause the guide of the shiftable member to cooperate with the operating portion of the other shifting mechanism to hold the latter against movement.

CHARLES H. SAMPSON.